July 28, 1959  J. TE WINKEL  2,897,430
STABILIZED TRANSISTOR ELECTRICAL POWER SUPPLY
Filed Sept. 29, 1954

INVENTOR
JAN TE WINKEL
BY
AGENT

United States Patent Office 2,897,430
Patented July 28, 1959

2,897,430
STABILIZED TRANSISTOR ELECTRICAL POWER SUPPLY

Jan Te Winkel, Eindhoven, Netherlands, assignor, by mesne assignments, to North American Philips Company, Inc., New York, N.Y., a corporation of Delaware Application September 29, 1954, Serial No. 459,151

Claims priority, application Netherlands October 2, 1953

1 Claim. (Cl. 323—22)

This invention relates to power supply circuits for electric consuming devices in which a direct-voltage source of supply which is subject to variations is connected to the consuming device by way of the emitter-collector path of a transistor. Such a circuit has been suggested in a prior patent application (not yet published), but in this circuit the current traversing the consuming device is stabilized instead of the voltage across it, which is in certain cases undesirable if the impedance of the consuming device is variable.

The invention provides a very simple solution for stabilizing the voltage of the consuming device and exhibits the characteristic that the supply source is included in the collector circuit, the consuming device is included in the emitter circuit, and a source of constant voltage is included in the base circuit, of the transistor.

Figure 1:
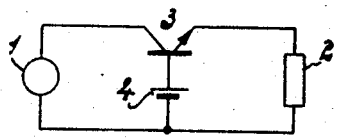
Figure 2:
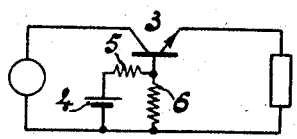
Figure 3:
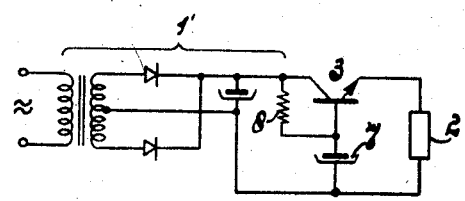

In order that the invention may be readily carried into effect, it will now be described with reference to the accompanying drawing, given by way of example, in which Fig. 1 shows the principle diagram, Fig. 2 shows a modification and Fig. 3 shows a preferred embodiment of the invention.

Referring now to Fig. 1, a direct-voltage source of supply 1 which is subject to variations, for example a mains alternating-voltage rectifying circuit, is connected to a consuming device 2, which may be variable, by way of the collector-emitter electrode path of a transistor 3, that is to say the source 1 and the consuming device 2 are included in the collector circuit and the emitter circuit, respectively, of a transistor 3, whereas a source 4 of constant voltage is included in its base circuit. The voltage across the consuming device 2 is thus stabilized at a value substantially equal to the voltage of the source 4, that is to say any variation in the voltage of the consuming device, either due to a variation in the voltage of the source 1, or in the impedance of the consuming device 2, results in a material variation of the current traversing the transistor 3 such that the initial variation in voltage is counteracted. Furthermore, the circuit affords the advantage that the transistor 3 functions properly even at a very low potential difference between the emitter electrode and the collector, so that the resultant voltage of the consuming device need be only slightly smaller than the minimum value of the supply voltage.

Fig. 2 shows a modified form of the circuit of Fig. 1, in which the source 4 is connected by way of a voltage divider 5, 6 which may be variable, to the base electrode of the transistor 3, by means of which the voltage of the consuming device may be adjusted.

Fig. 3 shows a preferred embodiment of the circuit according to the invention in which the supply source 1', as before, is included in the collector circuit and the consuming device 2 is included in the emitter circuit of the transistor 3, a capacitor 7 is included in the base circuit of transistor 3, serving as the source of constant voltage, a resistor 8 having a comparatively large value of resistance being included between the base electrode and the collector, so that the voltage supplied by way of resistor 8 to the capacitor 7 from the supply source 1', and hence also the voltage of the consuming device, remain substantially constant.

The transistor 3 and its associated capacitor 7 and resistor 8 act both to smooth out relatively rapid variations of the input voltage and to provide a low D.C. resistance. The smoothing action results from the fact that the voltage applied between the base and emitter electrodes of the transistor is smoothed by the combination of the resistor 8 and the capacitor 7, so that the base current of the transistor 3 cannot follow relatively rapid variations of the voltage of the supply source. If the transistor is operated on the saturation part of its characteristic, its collector and therefore also its emitter current is substantially solely dependent on its base current; thus the emitter current supplied to the consuming device 2 and therefore the voltage across said device remains substantially constant in spite of relatively rapid fluctuations in the supply source voltage. By making resistor 8 comparatively large, the time constant of the base circuit of the transistor is also comparatively large, thus providing good smoothing action. The resistor 8 also functions to bias the base in the forward direction so that the emitter-collector path of the transistor exhibits a relatively low D.C. resistance and a relatively high impedance to voltage fluctuations of the source which are relatively rapid with respect to the time constant of the biasing circuit.

The transistor used is preferably a junction transistor, since this type of transistor exhibits the optimum characteristics for the object aimed at. It will be evident that the polarities of the voltage sources and the type of the transistor 3 may be reversed, if desired.

While I have thus described my invention with specific examples and embodiments thereof, other modifications will be readily apparent to those skilled in the art without departing from the spirit and the scope of the invention as defined in the appended claim.

What is claimed is:

A stabilized power supply circuit for a two-terminal electric consuming device, comprising a two-terminal direct-voltage power supply source subject to having voltage variations, a transistor having emitter, collector and base electrodes, means connecting said collector electrode to a terminal of said power supply source, means connecting said emitter electrode to a terminal of said consuming device, a resistor connected directly between said base and collector electrodes whereby said base electrode is biased in the forward direction by voltage from said supply source thereby providing a relatively low value of direct-current resistance in the collector-emitter path of said transistor, and a capacitor connected between said base electrode and the remaining said terminals of the supply source and consuming device, thereby smoothing said forward bias voltage applied to said base electrode and providing a relatively high impedance to said voltage variations of said supply source.

References Cited in the file of this patent
UNITED STATES PATENTS

| | | |
|---|---|---|
| 2,585,078 | Barney | Feb. 12, 1952 |
| 2,693,568 | Chase | Nov. 2, 1954 |
| 2,730,576 | Caruthers | Jan. 10, 1956 |